June 4, 1946.    P. G. HOLT    2,401,354
AUTOMATIC PILOT FOR AIRCRAFT
Filed May 12, 1942    4 Sheets-Sheet 1
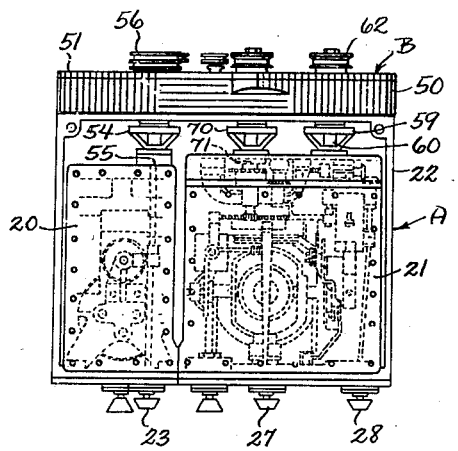
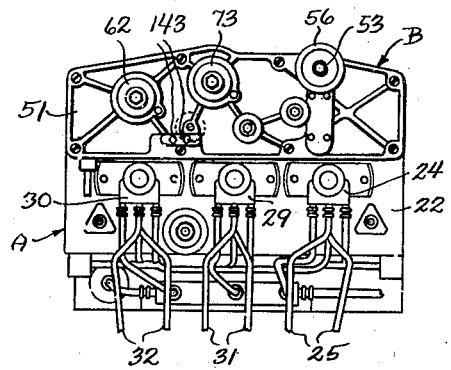
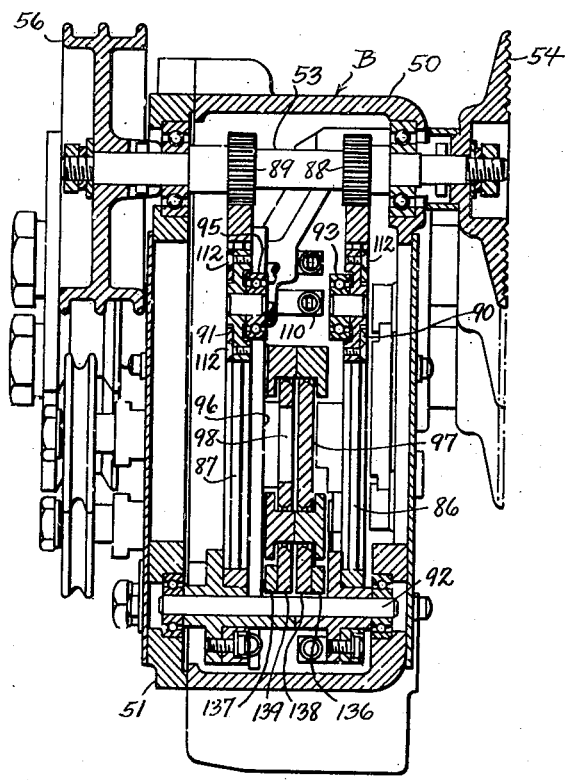
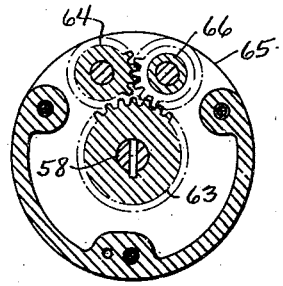
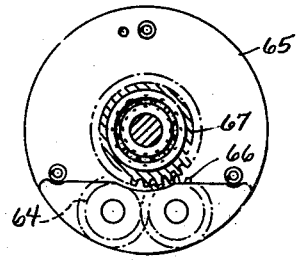
INVENTOR
Pliny G. Holt
BY
ATTORNEY

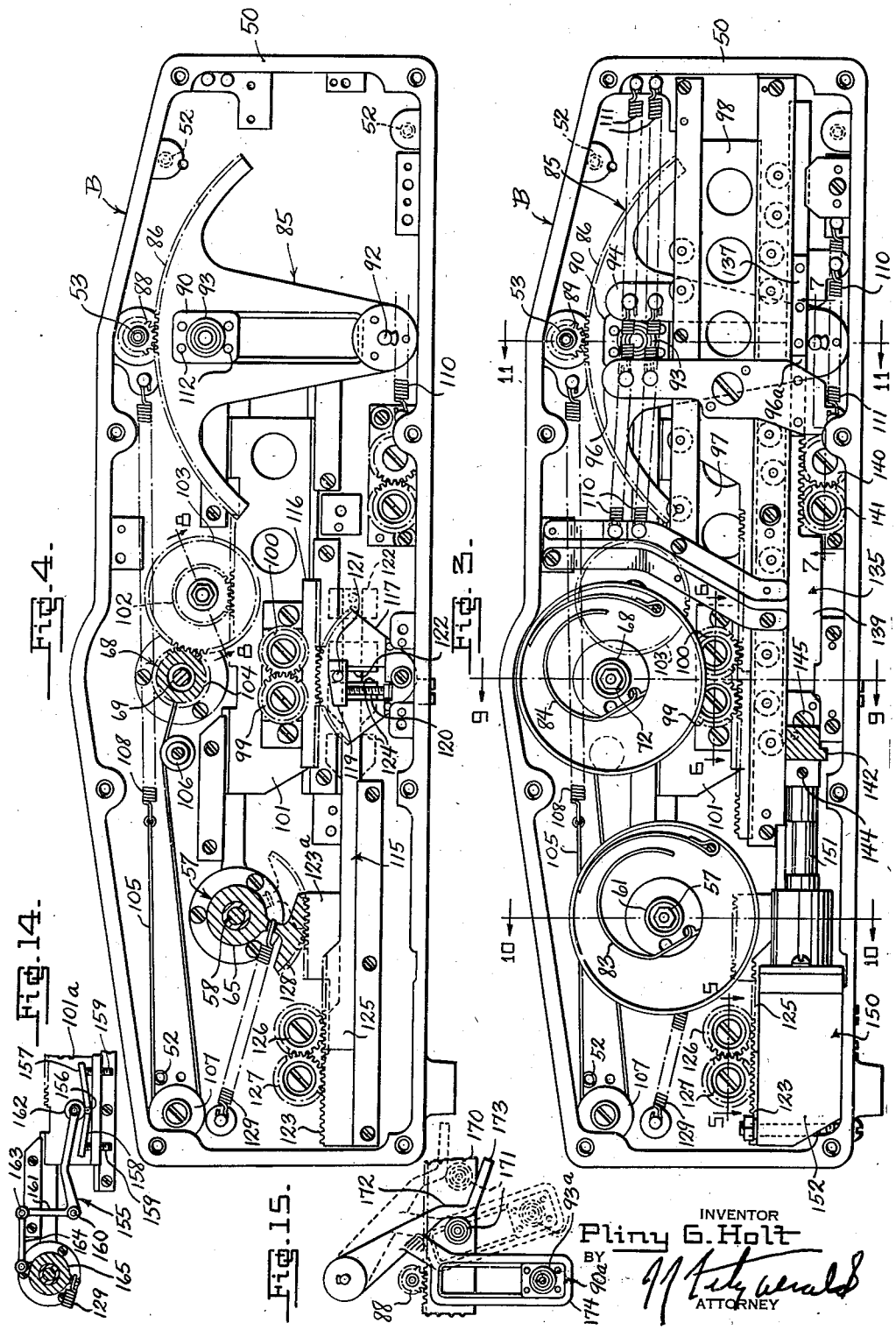

June 4, 1946.   P. G. HOLT   2,401,354
AUTOMATIC PILOT FOR AIRCRAFT
Filed May 12, 1942   4 Sheets-Sheet 3

INVENTOR
Pliny G. Holt
BY
ATTORNEY

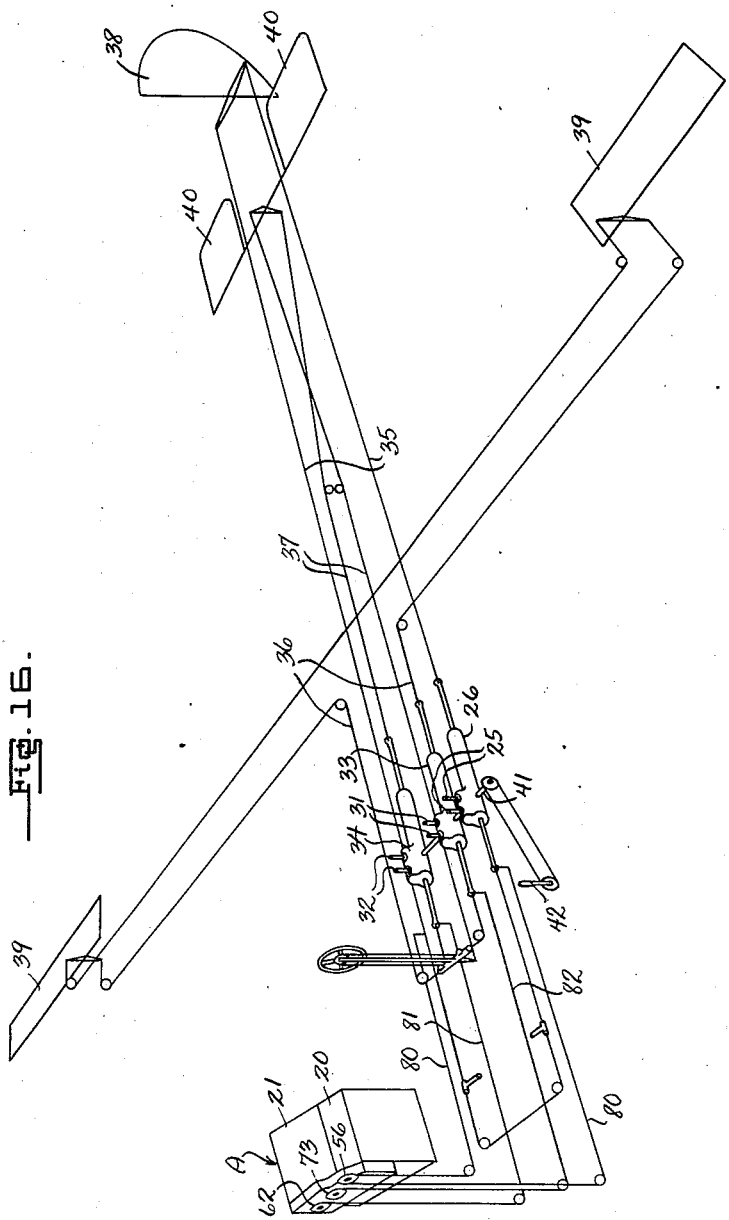

Patented June 4, 1946

2,401,354

UNITED STATES PATENT OFFICE 2,401,354

AUTOMATIC PILOT FOR AIRCRAFT

Pliny G. Holt, United States Navy

Application May 12, 1942, Serial No. 442,728

18 Claims. (Cl. 244—76)

(Granted under the act of March 3, 1883, as amended April 30, 1928; 370 O. G. 757)

The invention relates to improvements in automatic pilots for aircraft, an important object being to provide a bank and climb proportioning device for use in conjunction with an aircraft gyro-pilot of the general character shown and described in U. S. Patent No. 1,992,970 granted to Sperry, Jr., et al.

Another important object of the invention is to provide an aircraft gyro-pilot having means for correlating the amount of bank and climb with the rudder displacement of the aircraft.

A further object of the invention is the provision of an aircraft gyro-pilot having means for correlating the amount of right and left bank with the amount and direction of rudder of the aircraft.

Another object of the invention is to provide an aircraft gyro-pilot having means for correlating the amount of climb with the amount and direction of rudder of the aircraft.

Yet another object resides in the provision of an aircraft gyro-pilot having means for influencing the bank and climb control mechanism upon the occurrence of rudder movement beyond a predetermined amount.

A still further object is the provision of a bank proportioning unit for use in conjunction with a gyro-pilot and which unit operates to correlate the angle of bank with the amount of rudder displacement by displacing the aileron indice of the gyro-pilot.

The invention also aims to provide means for adjusting the pitch index of an automatic gyro-pilot in accordance with the amount of rudder displacement whereby nosing over is prevented at the start and during a turn in either direction.

Other objects and advantages of the invention will become apparent during the course of the following detailed description, taken in connection with the accompanying drawings, forming a part of this specification, and in which drawings, Figure 1 is a top plan view of the bank and climb proportioning unit attached to a conventional gyro-pilot control unit.

Figure 2 is a view in rear elevation of the units shown in Figure 1.

Figure 3 is a view in rear elevation of the bank and climb proportioning unit shown in Figure 2, with the cover plate removed.

Figure 4 is a view similar to Figure 3 but with certain interior parts removed and in section.

Figures 9–11 are vertical sectional views taken substantially on the lines 9—9, 10—10 and 11—11 of Figure 3.

Figure 10:
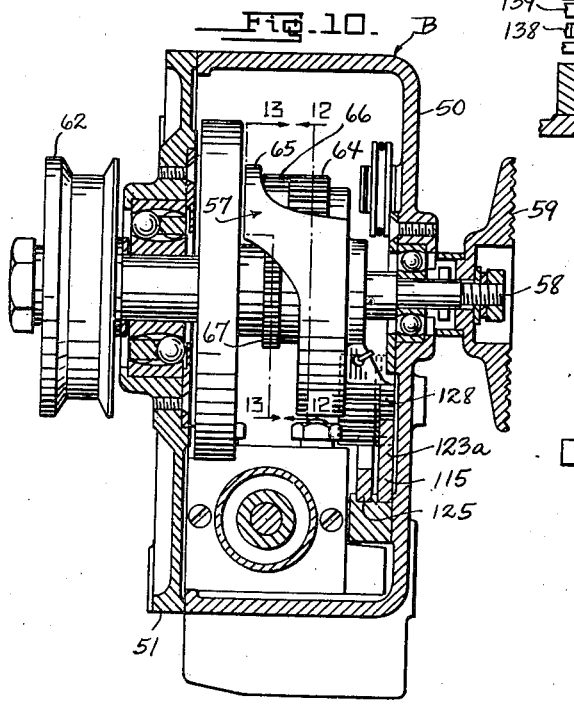
Figure 8:
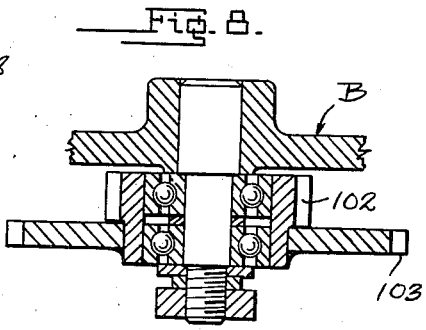
Figure 8 is a sectional detail view taken substantially on the line 8—8 of Figure 4.

Figures 12 and 13 are sectional detail views taken substantially on the lines 12—12 and 13—13 of Figure 10.

Figure 14 is a fragmentary detail view partly in side elevation and partly in vertical section of a modified form of motion transmitting connection associated with the elevator differential.

Figure 15 is a fragmentary detail view in side elevation of a modified form of motion transmitting mechanism associated with the rudder shaft of the bank unit.

Figure 16 is a diagrammatic view of a gyro-pilot provided with the bank and climb proportioning unit and showing the servo cable connections to the aircraft control surfaces.

In the drawings, which show preferred and modified forms of the invention, and wherein similar reference characters denote corresponding parts throughout the several views, the letter A generally designates a conventional gyro-pilot provided with the bank and climb proportioning unit B.

In the example shown, the gyro-pilot A is of the general character shown and described in U. S. Patent No. 1,992,970 granted to Sperry, Jr., et al., and includes a rudder servo control unit 20 and an aileron and elevator servo control unit 21, these units being mounted side by side in a suitable frame 22. The rudder servo control unit 20 is provided with a rudder knob 23 for manually varying the relationship between the usual directional gyro and pneumatic ports (not shown), the latter controlling a conventional hydraulic valve 24 connected, as by oil conduits 25, to the rudder servo-motor 26 shown in Figure 16. The aileron and elevator servo control unit 21 is provided with aileron and elevator knobs 27, 28 for manually varying the relationship between the usual vertical gyro and pneumatic ports (not shown), the latter controlling conventional hydraulic valves 29, 30 connected, as by oil conduits 31, 32, to the aileron and elevator servo-motors 33, 34 respectively. As shown in Figure 16, the rudder, aileron and elevator servo-motors 26, 33 and 34 are connected, as by suitable cables 35, 36, 37 to the rudder, aileron and elevator surfaces 38, 39, 40 respectively. These servo-motors may be provided with a common shaft 41 rotatable, as by a hand lever 42, to a position wherein the servo-motors are by-passed for manual control.

Figure 9:
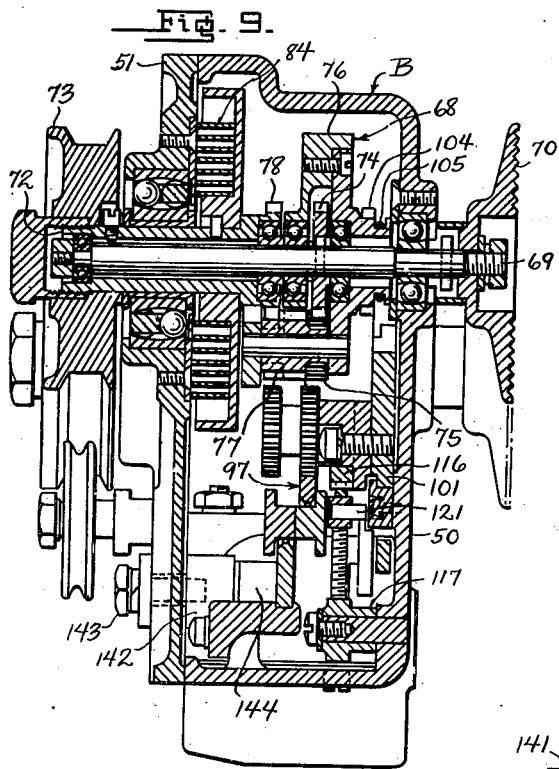

Referring now to the bank and climb proportioning unit B, the same includes an elongate housing 50 provided with a removable cover plate 51, and with openings 52 tapped to permit bolting of the unit B to the rear wall of the control unit frame 22. Rotatably mounted in the housing 50 is a rudder shaft 53 having its inner end connected, as by clutch means 54, to the rudder follow-up shaft 55 of the control unit 20, the outer end of the rudder shaft being provided with a rudder follow-up pulley 56. Rotatably mounted in the housing 50, as shown in Figure 10, is an elevator differential 57 including a driven shaft 58 connected, as by clutch means 59, to the elevator follow-up shaft 60 of the control unit 21, the differential 57 also including a driving sleeve 61 provided with an elevator follow-up pulley 62. Fixed on the shaft 58 is a gear 63, as shown in Figure 12, meshing with one gear 64 of a pair of intermeshing gears carried by a cage 65, the companion gear 66 in turn meshing with a gear 67 on the sleeve 61. Rotatably mounted in the housing 50, as shown in Figure 9, is an aileron differential 68 including a driven shaft 69 connected, as by clutch means 70, to the aileron follow-up shaft 71 of the control unit 21, the differential 68 also including a driving sleeve 72 provided with an elevator follow-up pulley 73. Fixed on the shaft 69 is a gear 74 meshing with one gear 75 of a pair of intermeshing gears carried by a cage 76, the companion gear 77 in turn meshing with a gear 78 on the sleeve 72.

Attached to the rudder follow-up pulley 56, as shown in Figure 16, is a pair of rudder follow-up wires 80 connected to opposite rudder cables 35 so as to rotate the rudder follow-up pulley 56 in response to operation of the rudder servo-motor 26. Attached to the elevator and aileron follow-up pulleys 62 and 73 are single elevator and aileron follow-up wires 81, 82 which, in conjunction with suitable tension springs 83, 84 in the elevator and aileron differentials, serve to rotate the elevator and aileron follow-up pulleys 62 and 73 in response to operation of the elevator and aileron servo-motors 34 and 33, respectively. The described arrangement is such that the rudder shaft 53, elevator differential 57 and aileron differential 68 form parts of the rudder, elevator and aileron follow-up connections between the servo-motors and their control units 20 and 21.

Suitable means 85 is provided for transmitting motion from the rudder shaft 53 to the aileron differential 68. As shown more particularly in Figures 3, 4 and 11, this motion transmitting means includes a pair of sector gears 86, 87 meshing with gears 88, 89 fast on the rudder shaft 53. These sector gears are provided with releasably fixed slides 90, 91 that are adjustable toward and away from the sector gear pivot 92. Mounted on the slide 90 is a roller 93, adapted, on clockwise movement of the sector gear 86 as viewed in Figures 3 and 4, to engage an arm 94. Mounted on the slide 91 is a roller 95 adapted, on counter-clockwise movement of the sector gear 87, to engage an arm 96. These arms 94 and 96 are rigidly secured in laterally offset relation to slidably mounted racks 97, 98 respectively meshing with intermeshing differential gears 99, 100 mounted on a sliding rack 101. Meshing with the rack 101 is a spur gear 102 carrying a larger spur gear 103 that meshes with a gear 104 integral with the aileron differential cage 76. In order to prevent backlash, one end of a flexible cord 105 is wound around the differential cage 76 as shown in Figure 9, this cord being trained around suitable sheaves 106, 107 and fastened at its opposite end to a suitably anchored contractile coil spring 108. Connected to the arm 94 are suitably anchored contractile coil springs 110 urging the arm 94 toward the roller 93, similar springs 111 urging the arm 96 toward the roller 95. It will be understood that, by independently adjusting the slides 90, 91, as by set screws 112, the throw of the rollers 93 and 95 may be varied whereby any one of a plurality of ratios of motion transmitted in opposite directions from the rudder shaft 53 to the aileron differential 68 may be selected.

Figure 5:
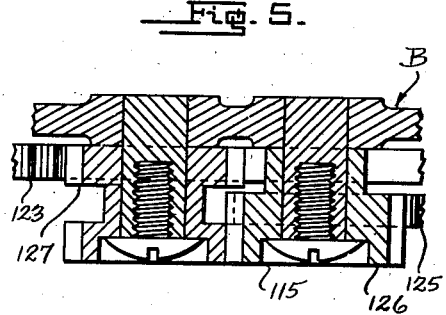
Figures 5–7 are sectional detail views taken substantially on the lines 5—5, 6—6, and 7—7 of Figure 3.
Figure 6:
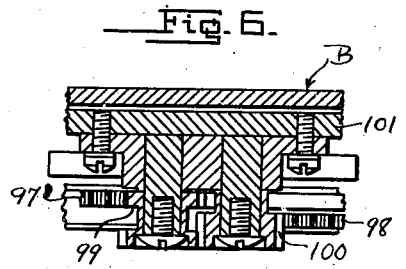

Suitable means 115 may be provided to transmit motion from the rudder shaft 53 to the elevator differential 57. Fixed on the sliding rack 101, which reciprocates responsive to rocking movement of the rudder shaft 53, is a rack 116 meshing with a sector gear 117. Mounted for sliding movement on the sector gear 117 toward and away from its pivot 118 is a slide 119 adjustable as by a screw 120. Projecting from the slide 119 is a pin 121 adapted, on clockwise movement of the sector 117, as viewed in Figure 4, to engage an abutment 122 forming part of a sliding rack 123. This pin 121, upon opposite movement of the sector 117, is adapted to engage an abutment 124 forming part of a sliding rack 125. Meshing with this rack 125 is one gear 126 of a pair of intermeshing differential gears, the companion gear 127 meshing with the sliding rack 123, as shown in Figure 5. The rack 123 is provided with a rack section 123a meshing with a sector gear 128 formed integrally on the elevator differential cage 65. Attached to the differential cage 65 is a suitably anchored contractile coil spring 129 for exerting a clockwise torque on the cage.

Figure 7:
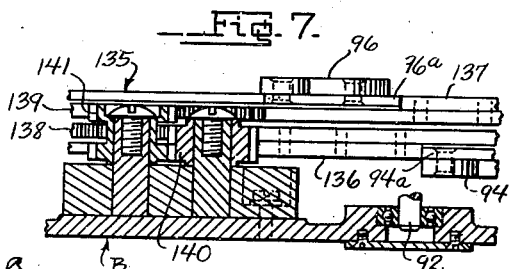

In order to provide an adjustable amount of lost-motion between the rudder shaft 53 and the aileron and elevator differentials 68 and 57, suitable means 135 may be employed, as shown more particularly in Figures 3 and 7. Disposed in the path of return travel of contact portions 94a, 96a of the arms 94, 96 are abutments 136, 137 attached to slidable racks 138, 139. Thus the abutments 136, 137 are adjustable to positions wherein return of the arms 94, 96 is limited. Meshing with the rack 138 is one gear 140 of a pair of intermeshing differential gears, the companion gear 141 meshing with the rack 139, so that movement of the rack 139 will impart an equal but opposite movement to the rack 138. Fixed on the inside of the cover plate 51 is a stop 142, adjustable as by set screws 143, and disposed in the path of return travel of a shouldered block 144 secured to the rack 139, as by screw 145. By adjusting the position of the stop 142, the amount of lost-motion occurring before the rollers 93, 95 engage the arms 94, 96 may be varied.

Means 150 may be provided to throw the unit B in or out of operation. Connected to the block 144, as by a rod 151, is a hydraulic motor 152 for advancing or retracting the block 144 relative to the stop 142. Movement of the block 144 to the left as viewed in Figure 3 will, through movement of the abutments 136, 137, carry the arms 94, 96 beyond the scope of travel of the rollers 93, 95, whereby to throw the unit B out of operation.

In the operation of the automatic pilot, movement of the rudder servo 26 in either direction, in response, for instance, to manual adjustment of the rudder knob 23, will actuate the rudder follow-up connections 80 thereby turning the rudder shaft 53 in a direction depending on the direction of movement of the rudder servo. Clockwise rotation of the rudder shaft gears 88, 89 will swing the sectors 86, 87 and the rollers 93, 95 to the left as viewed in Figures 3 and 4, whereby the roller 95 will carry the arm 96 and rack 98 to the left. This movement of the rack 98 to the left, while the rack 97 remains stationary, will turn the differential gear 100 in a clockwise direction, the companion gear 99 thus being rotated in a counter-clockwise direction thereby carrying the rack 101 to the left. On the other hand, counter-clockwise rotation of the rudder shaft gears 88, 89 will swing the sectors 86, 87 and the rollers 93, 95 to the right, as viewed in Figures 3 and 4, whereby the roller 93 will carry the arm 94 and rack 97 to the right. This movement of the rack 97 to the right, while the rack 98 remains stationary, will turn the differential gear 99 in a counter-clockwise direction, the companion gear 100 thus being rotated in a clockwise direction thus carrying the rack 101 to the right. Movement of the rack 101 to the left or right will, through the spur gears 102, 103, turn the aileron differential cage 68 in a counter-clockwise or clockwise direction, respectively. It will, of course, be understood that rotation of the differential cage 68 relative to the differential sleeve 72 and gear 78 will be accompanied by a corresponding rotation of the shaft 69 forming a part of the follow-up connection to the bank and climb control unit 21.

Movement of the sliding rack 101 to the right responsive to counter-clockwise movement of the rudder shaft 53 will impart clockwise movement to the sector gear 117 thereby moving the rack 123 to the right as viewed in Figure 4. Movement of the sliding rack 101 to the left responsive to clockwise movement of the rudder shaft 53 will impart counter-clockwise movement to the sector gear 117 which in turn moves the rack 125 to the left. It will be understood that movement of the rack 125 to the left will be translated through the differential gears 126, 127 into movement of the rack 123 in the opposite direction. With this arrangement, therefore, any movement of the sector gear 117 in either direction away from its neutral position will impart counterclockwise movement to the elevator differential 57.

In lieu of means 115 for transmitting motion to the elevator differential, the means 155 shown in Figure 14 may be utilized. Pivoted at 156 on the sliding rack 101a is a pair of leaf cams 157, 158 provided with adjustment screws 159 for independently setting the inclination of the cams 157, 158. Pivoted at 160 is a bell crank lever 161 provided at one end with a roller 162 for engagement with the leaf cams, the other end of the lever 161 being connected at 163 with a link 164 to the elevator differential cage 165. This means 155 permits independent adjustment at the screws 159, of the movement transmitted to the elevator follow-up connection by opposite movements of the rudder follow-up connection.

Instead of transmitting motion from the rudder shaft 53 through the sector gears 86, 87, the arrangement illustrated in Figure 15 may be employed. Here one of the rudder shaft gears 88 meshes with a sliding rack 170 carrying a roller 171 engaging a pivoted arm 172 terminating in a laterally offset portion 173. Formed integrally with the arm 172 is a branch arm 174 carrying an adjustable slide 90a similar to the slide 90 and provided with a roller 93a for engagement with the arm 94. With this arrangement, counter-clockwise rotation of the rudder shaft gear will move the rack 170 and roller 171 to the right, the roller 171 at first swinging the arm 172 in a counter-clockwise direction and subsequently riding freely beneath the laterally offset portion 173, as shown in broken lines in Figure 15. It will be understood that a pair of these assemblies may be employed to replace the pair of sector gears 86, 87 of the unit B. With this arrangement, rocking of the rudder shaft 53 in either direction will impart no more than a predetermined amount of movement to the aileron and elevator follow-up connections.

It will thus be seen that I have provided means for transmitting motion from the conventional rudder follow-up connection of an automatic gyro-pilot to its aileron and elevator follow-up connections whereby movement of the aircraft rudder in either direction, in response, for instance, to movement of the rudder knob 23, will be accompanied by a correlated movement of the aircraft ailerons for banking purposes and by a sufficient amount of up elevator movement to prevent nosing over at the start of a turn.

Various changes may be made in the forms of invention herein shown and described without departing from the spirit of the invention or the scope of the following claims.

The invention described herein may be manufactured and/or used by or for the Government of the United States of America for governmental purposes without the payment of any royalties thereon or therefor.

What is claimed is:

1. A bank proportioning attachment for use with an aircraft gyro-pilot including rudder and aileron follow-up connections, a rudder shaft adapted to form part of the rudder follow-up connection, an aileron differential adapted to form part of the aileron follow-up connection, and means for transmitting motion from said rudder shaft to said aileron differential for correlating the amount of bank with the rudder displacement of the aircraft.

2. A bank proportioning attachment for use with an aircraft gyro-pilot including rudder and aileron follow-up connections, a rudder shaft adapted to form part of the rudder follow-up connection, an aileron differential adapted to form part of the aileron follow-up connection, and a lost-motion connection between the rudder shaft and the aileron differential for producing a lag in the motion from said rudder shaft to said aileron differential.

3. A bank proportioning attachment for use with an aircraft gyro-pilot including rudder and aileron follow-up connections, a rudder shaft adapted to form part of the rudder follow-up connection, an aileron differential adapted to form part of the aileron follow-up connection, a lost-motion connection between the rudder shaft and the aileron differential producing a lag in the motion from the rudder shaft to the aileron differential, and operative means for releasing the connection between the rudder shaft and said aileron differential.

4. A bank and climb proportioning attachment for use with an aircraft gyro-pilot including rudder, aileron and elevator follow-up connections, a rudder shaft adapted to form part of the rudder follow-up connection, an aileron differential adapted to form part of the aileron follow-up connection, an elevator differential adapted to form part of the elevator follow-up connection, and means for transmitting motion from said rudder shaft to said aileron and elevator differentials for correlating the amount of bank and climb with the rudder displacement of the aircraft.

5. In combination with an automatic pilot for aircraft including rudder and aileron motors, separate control means for said rudder and aileron motors, gyroscopic means associated with said rudder and aileron control means for operating said control means in response to changes in direction and bank of the aircraft, and rudder and aileron follow-up connections between said motors and said rudder and aileron control means for operating said control means responsive to operation of said rudder and aileron motors; of means transmitting motion from said rudder follow-up connection to said aileron follow-up connection to correlate the amount of bank with the rudder displacement of the aircraft.

6. In combination with an automatic pilot for aircraft including rudder, aileron and elevator motors, separate control means for said rudder, aileron and elevator motors, gyroscopic means associated with said rudder, aileron and elevator control means for operating said control means in response to changes in direction, bank and climb of the aircraft, and rudder, aileron and elevator follow-up connections between said motors and said rudder, aileron and elevator control means for operating said control means responsive to operation of said rudder, aileron and elevator motors; of means for transmitting motion from the rudder follow-up connection to the aileron and elevator follow-up connections to correlate the amount of bank and climb with the rudder differential of the aircraft.

7. In an automatic pilot for aircraft, rudder operating means, aileron operating means, means for controlling said rudder operating means, means for controlling said aileron operating means, means transmitting motion in a given direction from said rudder operating means to said aileron controlling means at any selected one of a plurality of ratios, and means transmitting motion in a direction opposite said given direction from said rudder operating means to said aileron controlling means at any selected one of a plurality of ratios, whereby the amount of right and left bank is correlated with the amount and direction of rudder displacement of the aircraft.

8. In combination with an automatic pilot for aircraft of the character including rudder and aileron motors, separate control means for said rudder and aileron motors, gyroscopic means associated with said rudder and aileron control means for operating said control means in response to changes in direction and bank of the aircraft, and rudder and aileron follow-up connections between said motors and said rudder and aileron control means for operating said control means responsive to operation of said rudder and aileron motors; of means transmitting motion in a given direction from said rudder follow-up connection to said aileron follow-up connection at any selected one of a plurality of ratios, and means transmitting motion in a direction opposite said given direction from said rudder follow-up connection to said aileron follow-up connection at any selected one of a plurality of ratios, whereby the amount of right and left bank is correlated with the amount and direction of rudder displacement of the aircraft.

9. A bank proportioning attachment for use with an aircraft gyro-pilot including rudder and aileron follow-up connections, a rudder shaft adapted to form part of the rudder follow-up connection, an aileron differential adapted to form part of the aileron follow-up connection, means for transmitting motion in a given direction from said rudder shaft to said aileron differential at any selected one of a plurality of ratios, and means for transmitting motion in a direction opposite said given direction from said rudder shaft to said aileron differential at any selected one of a plurality of ratios for correlating the amount of right and left bank with the amount and direction of rudder displacement of the aircraft.

10. In combination with an automatic pilot for aircraft including rudder and aileron motors, separate control means for said rudder and aileron motors, gyroscopic means associated with said rudder and aileron control means for operating said control means in response to changes in direction and bank of the aircraft, and rudder and aileron follow-up connections between said motors and said rudder and aileron control means for operating said control means responsive to operation of said rudder and aileron motors; of lost-motion connecting means between the rudder follow-up connection and the aileron follow-up connection for producing an adjustable lag in the motion between said two connections and thus correlating the amount of bank with the rudder displacement of the aircraft, means for varying the amount of lost motion and for rendering said connection inoperative by sufficiently increasing said lost motion, adjustable stop means for said lost motion varying means to limit the minimum amount of lost motion, and hydraulically operating means to move said lost motion varying means against said stop means to render said connection operative and in the other direction to render it inoperative.

11. In an automatic pilot for aircraft, rudder operating means, aileron operating means, means for controlling said rudder operating means, gyroscopic means for controlling said aileron operating means, adjustable lost-motion connecting means between the rudder operating means and the gyroscopic aileron controlling means for producing the amount of bank with the rudder displacement of the aircraft, means for varying the amount of lost motion and for rendering said connection inoperative by sufficiently increasing said lost motion, adjustable stop means for said lost motion varying means to limit the minimum amount of lost motion, and hydraulically operating means to move said lost motion varying means against said stop means to render said connection operative and in the other direction to render it inoperative.

12. In combination with an automatic pilot for aircraft including rudder and aileron motors, separate control means for said rudder and aileron motors, gyroscopic means associated with said rudder and aileron control means for operating said control means in response to changes in direction and bank of the aircraft, and rudder and aileron follow-up connections between said motors and said rudder and aileron control means for operating said control means responsive to operation of said rudder and aileron motors; of adjustable lost-motion connecting means between the rudder and aileron control means, said lost-motion connecting means acting on the aileron follow-up connection upon predetermined movement of said rudder follow-up connection for correlating the amount of bank with the rudder displacement of the aircraft.

13. In combination with an automatic pilot for aircraft of the character including rudder and aileron motors, separate control means for said rudder and aileron motors, gyroscopic means associated with said rudder and aileron control means for operating said control means in response to changes in direction and bank of the aircraft, and rudder and aileron follow-up connections between said motors and said rudder and aileron control means for operating said control means responsive to operation of said rudder and aileron motors; of differential means connecting said rudder follow-up connection to said aileron follow-up connection for correlating the amount of bank with the rudder displacement of the aircraft while permitting operation of the aileron follow-up connection independently of the rudder follow-up connection.

14. In combination with an automatic pilot for aircraft of the character including rudder, aileron and elevator motors, separate control means for said rudder, aileron and elevator motors, gyroscopic means associated with said rudder, aileron and elevator control means for operating said control means in response to changes in direction, bank and climb of the aircraft, and rudder, aileron and elevator follow-up connections between said motors and said rudder, aileron and elevator control means for operating said control means responsive to operation of said rudder, aileron and elevator motors; of differential means connecting said rudder follow-up connection to said aileron follow-up connection, and differential means connecting said rudder follow-up connection to said elevator follow-up connection, means for manually varying the setting of each of the controls whereby the amount of bank and climb is automatically correlated with the rudder displacement of the aircraft while permitting manual operation of the aileron and elevator controls independently of said rudder follow-up connection.

15. In an automatic pilot for aircraft, rudder operating means, aileron operating means, elevator operating means, means for controlling said rudder operating means, means for controlling said aileron operating means, means for controlling said elevator operating means, means transmitting motion from said rudder operating means to said aileron controlling means for correlating the amount of bank with the rudder of the aircraft, means transmitting motion in a given direction from said rudder operating means to said elevator controlling means at any selected one of a plurality of ratios, and means transmitting motion in a direction opposite said given direction from said rudder operating means to said elevator controlling means at any selected one of a plurality of ratios, for correlating the amount of climb with the amount and direction of rudder displacement of the aircraft.

16. In an automatic pilot for aircraft, rudder operating means, aileron operating means, elevator operating means, means for controlling said rudder operating means, means for controlling said aileron operating means, means for controlling said elevator operating means, means transmitting motion in a given direction from said rudder operating means to said aileron controlling means at any selected one of a plurality of ratios, means transmitting motion in a direction opposite said given direction from said rudder operating means to said aileron controlling means at any selected one of a plurality of ratios, means transmitting motion in a given direction from said rudder operating means to said elevator controlling means at any selected one of a plurality of ratios, and means transmitting motion in a direction opposite said given direction from said rudder operating means to said elevator controlling means at any selected one of a plurality of ratios, whereby the amount of bank and climb is correlated with the amount and direction of rudder displacement of the aircraft.

17. An automatic pilot for aircraft comprising rudder and aileron motors, separate control means for said rudder and aileron motors, gyroscopic means associated with said rudder and said aileron control means for operating said control means in response to changes in direction and bank of the aircraft, and rudder and aileron follow-up connections between said motors and said rudder and aileron control means respectively, for operating said control means responsive to operation of said respective rudder and aileron motors, differential means connecting said rudder follow-up connection to said aileron follow-up connection, means for manually adjusting the rudder control means relative to said gyroscopic means for varying the course of the aircraft, and means transmitting motion from said rudder follow-up connection to said aileron follow-up connection to correlate the amount of bank with the rudder displacement of the aircraft.

18. In an automatic pilot for aircraft, rudder operating means, aileron operating means, elevator operating means, gyroscopic means for controlling said rudder operating means, gyroscopic means for controlling said aileron and said elevator operating means, differential means connected to said gyroscopic rudder controlling operating means and operated by said rudder follow-up means and said aileron and elevator gyroscopic controlling means, whereby the bank and climb angles are correctly proportioned with the rudder displacement of the aircraft.

PLINY G. HOLT.